United States Patent [19]

Burlacot

[11] Patent Number: 5,746,853
[45] Date of Patent: May 5, 1998

[54] RADIAL HEAVY-DUTY TRUCK TIRE WITH CROWN REINFORCEMENT HAVING A MULTIPARTITE PLY

[75] Inventor: Laurence Burlacot, Riom, France

[73] Assignee: Compagnie Générale des Etablissements Michelin - Michelin Cie, Clermont-Ferrand Cedex, France

[21] Appl. No.: 743,559

[22] Filed: Nov. 4, 1996

[30] Foreign Application Priority Data

Nov. 8, 1995 [FR] France .................. 95 13304

[51] Int. Cl.$^6$ .................. B60C 9/18; B60C 9/20; B60C 9/22; B60C 9/28
[52] U.S. Cl. .................. 152/531; 152/209 R; 152/526; 152/534; 152/535; 152/536; 152/538
[58] Field of Search .................. 152/531, 526, 152/536, 209 R, 538, 534, 535, 533

[56] References Cited

U.S. PATENT DOCUMENTS

| 3,335,777 | 8/1967 | Hutch | 152/535 |
|---|---|---|---|
| 4,271,889 | 6/1981 | Pommier | 152/534 X |
| 4,271,890 | 6/1981 | Pommier | |
| 4,934,429 | 6/1990 | Koseki et al. | |
| 4,942,914 | 7/1990 | Takahashi et al. | |

FOREIGN PATENT DOCUMENTS

| 792853 | 1/1936 | France | |
|---|---|---|---|
| 6262905 | 9/1994 | Japan | 152/526 |

Primary Examiner—Adrienne C. Johnstone
Attorney, Agent, or Firm—Baker & Botts, L.L.P.

[57] ABSTRACT

A radial tire has a crown reinforcement (3) having at least two work crown plies (31, 32) of crossed inextensible metal cords, making angles of between 10° and 45° with the circumferential direction XX', and two limiting blocks (40) each composed of at least one ply of metal cords oriented at an angle of between 0° and 10°, the blocks (40) being arranged in two separate regions on either side of the equatorial plane XX' and radially between the carcass reinforcement (1) and the radially outermost work crown ply (32). The two limiting blocks (40) are axially joined together by an additional reinforcement (41) which is composed of at least one ply of circumferentially oriented textile or metal cords and is centered on the equatorial plane XX', its tensile rigidity being at most equal to 0.5 times the tensile rigidity of the most extensible ply of the limiting blocks (40).

5 Claims, 2 Drawing Sheets

5,746,853

RADIAL HEAVY-DUTY TRUCK TIRE WITH CROWN REINFORCEMENT HAVING A MULTIPARTITE PLY

BACKGROUND OF THE INVENTION

The invention relates to a tire having a radial carcass reinforcement anchored in each bead to at least one bead wire, and comprising a crown reinforcement having at least two so-called work plies which are superimposed and formed from wires or cords parallel with each other in each ply and crossed from one ply to the next, making angles of at most 45° in absolute value with the circumferential direction of the tire.

It relates more particularly to a tire of the heavy-duty truck type, in which the ratio of the height above rim H to its maximum axial width S is at most equal to 0.80, intended to equip an average-tonnage or high-tonnage vehicle, such as a truck, bus, trailer, etc.

In a tire, it is very well known to use crown reinforcement composed, on the one hand, of so-called work plies formed from cords making a certain angle with the circumferential direction and, on the other hand, of additional plies formed from cords which are oriented substantially circumferentially. An example of such a structure is shown and described in the U.S. Pat. No. 3,677,319, the work plies being formed from metallic elements oriented at angles of between 18° and 75°, while the additional plies are formed from textile cords oriented at 0°. Such an architecture makes it possible to reconcile the contradictory qualities to be obtained in an automobile tire: for example, vehicle road holding and comfort, wear resistance and rolling resistance. The additional textile plies may be arranged below or above or between the plies of metal cords, the width of the textile assembly being between 25 and 75% of the width of the metal structure.

U.S. Pat. No. 4,271,890 teaches that the type of tire in question, having a low H/S ratio, although exhibiting many advantages, also has a certain number of drawbacks, such as the mediocre adhesion of the equatorial region of the tread, due to the shortening of the contact area in the longitudinal direction of the tire. In order to remedy said drawbacks, which are a cause of the marginal regions of the crown plies being prestressed and are consequently the cause of shearing between plies, the U.S. '890 patent recommends arranging, between the carcass bracing and the radially internal work ply, in two separate regions away from the equatorial plane, two limiting blocks each consisting of two superimposed plies of inextensible cords which are crossed from one ply to the next, making opposed angles with the circumferential direction which are at most equal in absolute value to half the smallest angle used in the work plies, and which are different from 0°. Although the solution recommended in said patent makes it possible furthermore to improve the fatigue life of the tire, the resistance to separation between work plies at their extremities being increased, and the plies of the limiting blocks not being subjected to said separation, it does, on the other hand, cause too great a hoop stress leading to the risk of putting the work ply cords into compression when they are flattened.

With a view to improving the wear of the low H/S tire, as well as the resistance to separation of the crown plies, U.S. Pat. No. 4,934,429 claims, in contrast to the previous one, the use of extensible metal cords, whose orientation with respect to the circumferential direction may be zero, in an additional reinforcement composed of at least one ply having two portions on either side of the equatorial plane, the extensibility of the cords being chosen as a function of the tensile moduli desired, respectively, for the reinforcing ply or plies and the crown plies.

In the case of the use of tires as described hereinabove, for example on so-called low heavy-duty truck trailers, the center of gravity of said trailers generally being lower compared to the usual centers of gravity of trucks and the tires working at high degrees of flexure, the use of additional reinforcing plies of elastic circumferential cords or the use of limiting blocks having cords which are inclined with respect to the circumferential direction does not make it possible to obtain the best compromise between, on the one hand, the durability of the crown reinforcement and, on the other hand, the wear of the tire's tread, the durability of the crown reinforcement relating to the separation between plies and/or the failure of the cords in compression.

SUMMARY OF THE INVENTION

The tire in accordance with the invention, having a radial carcass reinforcement surmounted radially by a crown reinforcement comprising at least two work crown plies of inextensible metal cords which are crossed from one ply to the next, making angles of between 10° and 45° with the circumferential direction, and two limiting blocks each composed of at least one ply of metal cords oriented with respect to the circumferential direction at an angle of between 0° and 10°, said blocks being arranged in two separate regions on either side of the equatorial plane, and radially between the carcass reinforcement and the radially outermost work crown ply, is characterized in that the two limiting blocks are axially joined together by an additional reinforcement which is composed of at least one ply of circumferentially oriented textile or metal cords and is centered on the equatorial plane, its tensile rigidity per unit width, measured in the direction of the cords, being, in the field of operation of the tire, at most equal to 0.5 times the tensile rigidity, measured under the same conditions, of the most extensible ply of the limiting blocks.

Textile yarn or cord should be understood to mean any yarn or cord produced from filaments of man-made material such as, for example, rayon, an aliphatic and/or aromatic polyamide, or a polyester. A metal wire or cord is generally made of steel.

The tensile rigidity of a ply of cords is the ratio of the tensile force, exerted in the direction of the cords, per unit width, necessary for obtaining a given relative elongation, to said elongation.

In order to reduce the tension experienced by the metal limiting blocks, and thus to limit the risk of tensile failure of the cords used, it is advantageous furthermore to arrange, axially outside each limiting block, an additional side reinforcement which is itself composed of at least one ply of textile yarns or cords or of metal wires or cords which may or may not satisfy the same tensile rigidity conditions as the central additional reinforcement, and the axial width of which is such that its axially external extremity lies axially inside the axially external edge of the widest work crown ply.

Preferably, in combination with the presence of additional reinforcements or in the absence of such reinforcements, the thickness of vulcanized rubber mix, measured in each case radially between the set of the radially external generatrices of the cords of the radially outermost ply of a limiting block and the set of the radially internal generatrices of the cords of the work crown ply radially above this radially outermost ply, is at least equal to the sum of the radii of the respective cross sections of the cords of the above two plies and in all cases at least equal to 1.1 mm.

In order that each limiting block is obtained by laying one or two prefabricated plies on the carcass reinforcement or by winding a yarn or wire or cord around said carcass reinforcement, the axial width of each block will advantageously be between the values $M_B$ and $m_B$, $M_B$ being equal to $(0.4-0.32\ H_O/S_O) \cdot S_O$ and $m_B$ being equal to $(0.2-0.16\ H_O/S_O) \cdot S_O$, while the mid-axes of said blocks are separated axially by a distance lying between the values $D_B$ and $d_B$, $D_B$ being equal to $(0.8-0.64\ H_O/S_O) \cdot S_O$ and $d_B$ being equal to $(0.5-0.4\ H_O/S_O) \cdot S_O$, $H_O/S_O$ being the aspect ratio of the thickness center line of the carcass reinforcement, that is to say the ratio of its height above rim $H_O$ to its maximum axial width $S_O$. This axial arrangement makes it possible for the metal cords of the limiting blocks to have a higher safety factor, the safety factor of a cord being the ratio of its tensile strength to the maximum tensile force applied while the tire is rolling, thereby allowing better fatigue life, while at the same time maintaining the good properties of resistance to separation between the work crown plies.

In order to achieve the optimum compressive strength of the cords of the crown reinforcement, and in particular of the work crown ply closest to the carcass reinforcement, it is also advantageous to use unequal angles for said work crown plies, the angle which the cords of the work ply closest to the carcass reinforcement make being greater than the angle which the cords of the second work ply make. Likewise, a transverse radius of curvature of the tread, preferably greater than 1.5 times its circumferential radius, measured in the equatorial plane, improves the durability performance of the crown reinforcement.

The characteristics and advantages of the invention will be more clearly understood with the aid of the description which follows and which refers to the drawing, illustrating in a non-limiting manner one embodiment.

DESCRIPTION OF PREFERRED EMBODIMENTS

Figure 1:
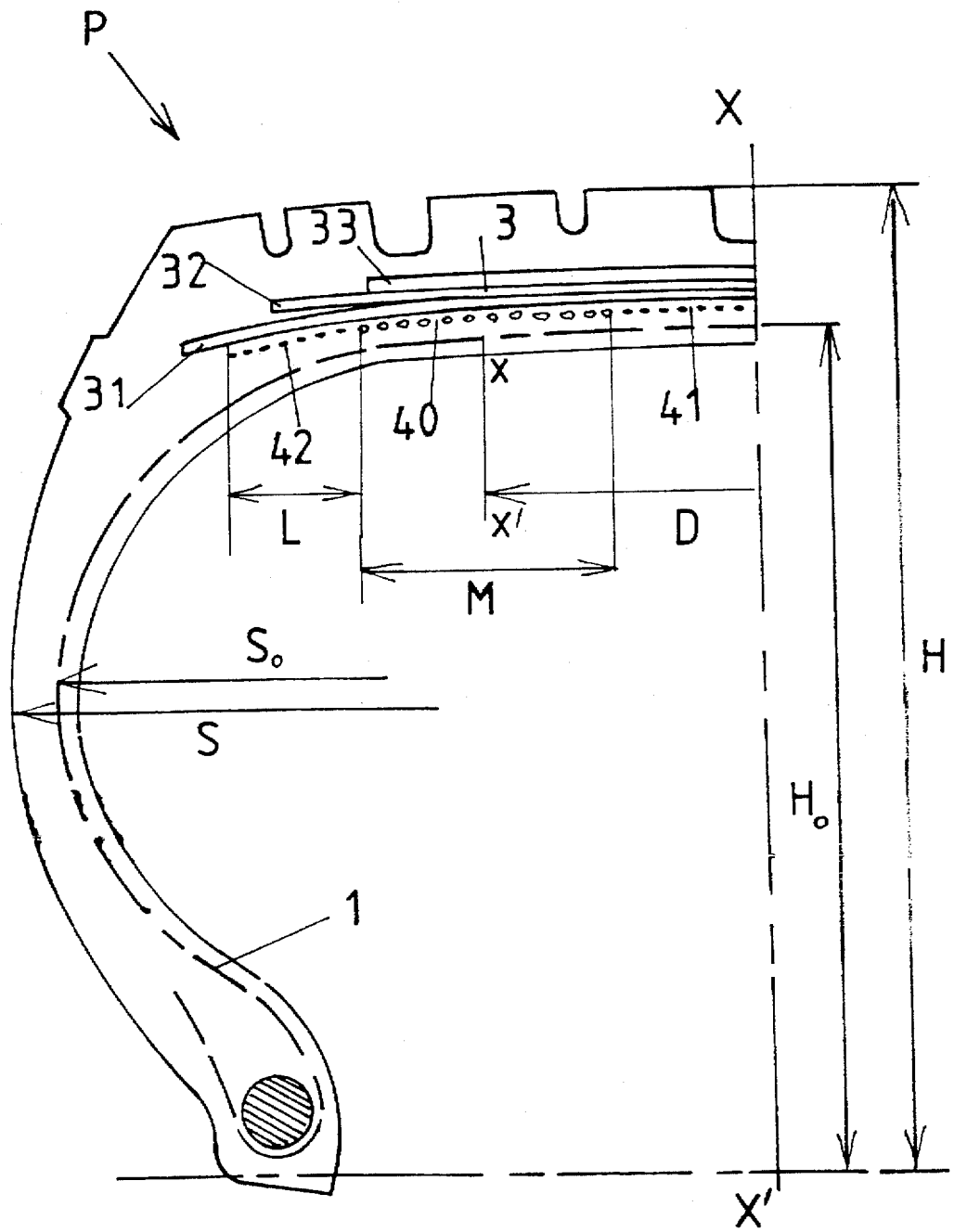
FIG. 1 diagrammatically represents, seen in meridional section, a crown reinforcement in accordance with the invention.
Figure 2:
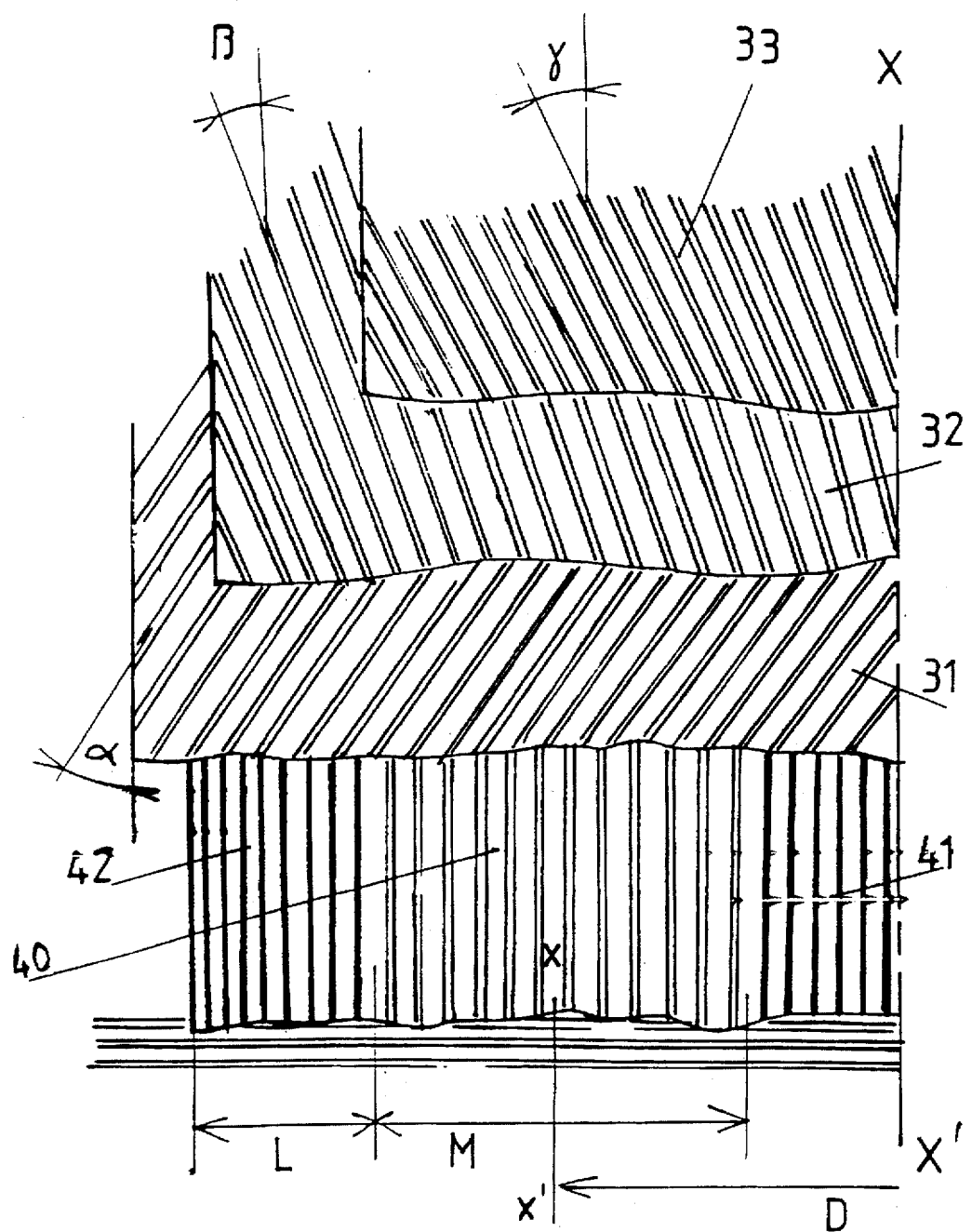
FIG. 2 represents, seen in cutaway plan view, the crown reinforcement of FIG. 1.

The tire P, of 215/75 R 17.5×size, has an aspect ratio H/S equal to 0.75. Said tire comprises a radial carcass reinforcement 1 anchored in each bead to at least one bead wire, forming a turnup, and formed from a single ply of metal cords. This carcass reinforcement 1 is hooped by a crown reinforcement 3 which is formed, radially from the outside to the inside (FIGS. 1 and 2), radially outermost, a so-called protective ply 33 consisting of elastic metal cords, that is to say, cords having an elongation greater than or equal to 0.3% for a tensile force of 1 daN and having a Young's modulus conventionally less than 130 GPa, said cables being oriented with respect to the circumferential direction XX' at an angle γ of 18° and said ply being centered on the equatorial plane XX' with an axial width of 120 mm;

radially below the ply 33, the second work crown ply 32 formed from inextensible metal cables, that is to say, cables having an elongation of less than 0.3% for a tensile force of 1 daN and having a Young's modulus always greater than 160 GPa for a tensile force of between TS/10 and TS/1.2, TS being the breaking strength of said cord. The cords of this ply 32 are oriented in the same direction as the cords of the ply 33 and make an angle β of 18° with the circumferential direction, said work ply 32 having a width of 152 mm;

then a first work ply 31 consisting of cables which are identical to those in the ply 32, and making an angle α of 26° with the circumferential direction, but which are crossed with those of the second work ply 32, said ply 31 having an axial width of 166 mm;

and finally, between the first work ply 31 and the carcass reinforcement, a multipartite reinforcement 4 consisting, on the one hand, of two limiting blocks 40 and, on the other hand, of a central additional reinforcement 41 and of two additional side reinforcements 42.

Each limiting block 40 is formed, in the example shown, from a layer 40 obtained by winding an inextensible metal cord (according to the same elongation definition as for the cords of the work crown plies 31 and 32), until an axial width M, equal to 27 mm for the size in question, is obtained. Since the axial distance between cords, or the pitch $p_O$, is small (70 cords per dm of width), the winding angle is virtually equal to 0°. With regard to the mid-axes xx' of the limiting blocks, these are axially separated by a distance D equal to 63 mm, the lengths $H_O$ and $S_O$ being respectively equal to 168 mm and 221 mm. Arranged between the axially internal extremities of the two limiting blocks 40 is a first central reinforcement 41 consisting of a single layer, obtained by winding, of a metal cord made of steel and oriented virtually circumferentially; the pitch between the windings of said metal cords and the elongation properties respectively of the limiting blocks and of those of the additional ply being such that the tensile rigidity of the central additional ply is equal to 0.5 times the tensile rigidity of the limiting block, in the field of operation of the tire. Arranged axially outside each axially external extremity of each limiting block 40 is a second additional reinforcement 42 consisting of a single layer, also obtained by winding, of a cord made of aromatic polyamide, the winding continuing until the width L of said side reinforcement is such that the axially external extremity is axially inside the axially external extremity of the work crown ply radially closest to the carcass reinforcement, which is the widest.

I claim:

1. A tire, having a radial carcass reinforcement surmounted radially by a crown reinforcement comprising at least two work crown plies of inextensible metal cords which are crossed from one ply to the next, making angles of between 10° and 45° with the circumferential direction XX', and two limiting blocks each composed of at least one ply of metal cords oriented with respect to the circumferential direction XX' at an angle of between 0° and 10°, said blocks being arranged in two separate regions on either side of the equatorial plane XX', and radially between the carcass reinforcement and the radially outermost work crown ply, the tire characterized in that the two limiting blocks are axially joined together by a reinforcement which is composed of at least one ply of circumferentially oriented textile or metal cords centered on the equatorial plane XX', the tensile rigidity per unit width of the reinforcement, measured in the direction of the cords, being, in the field of operation of the tire, at most equal to 0.5 times the tensile rigidity, measured under the same conditions, of the most extensible ply of the limiting blocks.

2. A tire according to claim 1, characterized in that additional side reinforcements are arranged axially outside the limiting blocks, each such additional side reinforcement including at least one ply of textile or metal circumferential cords and having a width L, such that its axially external extremity is axially inside the extremity of the axially widest work ply.

3. A tire according to claim 2, characterized in that the cords of each such additional side reinforcement have the same tensile rigidity as the cords of the central reinforcement.

4. A tire according to claim 1, characterized in that the thickness of vulcanized rubber mix, measured in each case radially between the set of the radially external generatrices of the cords of the radially outermost ply of a limiting block and the set of the generatrices radially internal of the cords of the work crown ply radially above this radially outermost ply, is at least equal to the sum of the radii of the respective cross sections of the cords of the above two plies, and in all cases at least equal to 1.1 mm.

5. A tire according to one of claim 1, characterized in that the axial width M of each block is between the values $M_B$ and $m_B$, M being equal to $(0.4-0.32\ H_O/S_O) \cdot S_O$ and $m_B$ being equal to $(0.2-0.16\ H_O/S_O) \cdot S_O$, while the mid-axes xx' of said blocks are separated axially by a distance D lying between the values $D_B$ and $d_B$, $D_B$ being equal to $(0.8-0.64\ H_O/S_O) \cdot S_O$ and $d_B$ being equal to $(0.5-0.4\ H_O/S_O) \cdot S_O$, $H_O/S_O$ being the aspect ratio of the thickness center line of the carcass reinforcement.

\* \* \* \* \*